US012625934B2

(12) United States Patent
Jones

(10) Patent No.: US 12,625,934 B2
(45) Date of Patent: May 12, 2026

(54) METHOD OF DISPLAYING CONTENT ON A SCREEN OF AN ELECTRONIC PROCESSING DEVICE

(71) Applicant: YEO Messaging Ltd, Henley on Thames (GB)

(72) Inventor: Alan Jones, Henley on Thames (GB)

(73) Assignee: YEO Messaging Ltd, Henley on Thames (GB)

( * ) Notice: Subject to any disclaimer, the term of this patent is extended or adjusted under 35 U.S.C. 154(b) by 0 days.

(21) Appl. No.: 18/136,474

(22) Filed: Apr. 19, 2023

(65) Prior Publication Data

US 2023/0252123 A1     Aug. 10, 2023

Related U.S. Application Data

(63) Continuation of application No. 16/800,154, filed on Feb. 25, 2020, now abandoned, which is a
(Continued)

(51) Int. Cl.
*G06F 21/32* (2013.01)
*G06F 21/62* (2013.01)
(Continued)

(52) U.S. Cl.
CPC .......... *G06F 21/32* (2013.01); *G06F 21/6218* (2013.01); *G06F 21/84* (2013.01);
(Continued)

(58) Field of Classification Search
CPC .... G06F 21/32; G06F 21/602; G06F 21/6218; G06F 21/84; G06V 40/172; G06V 40/70;
(Continued)

(56) References Cited

U.S. PATENT DOCUMENTS 9,100,825 B2 *  8/2015  Schultz ................. H04W 12/06
9,251,334 B1 *  2/2016  Molitor ................. H04L 9/3271
(Continued)

FOREIGN PATENT DOCUMENTS

CN      103455745 A     12/2013
CN      105354473 A     2/2016
(Continued)

OTHER PUBLICATIONS

NPL Search Terms (Year: 2024).*

*Primary Examiner* — Syed A Zaidi
(74) *Attorney, Agent, or Firm* — GableGotwals

(57) ABSTRACT

The invention provides a computer implemented method of receiving content at an electronic processing device. The electronic processing device has a data processing application. The method comprises a first step of receiving a message or invitation, said message or invitation not including the content to be received, wherein opening of the message or invitation causes the data processing application to configure a camera of the electronic processing device to capture image data. The data processing application uses image data captured by said camera of said electronic processing device to determine that a user viewing said screen is an authorized or recognized user and, in response to a positive determination, receives said content as encrypted content at said data processing application. In response to a negative determination, the content is not received said content at said data processing application. The data processing application is also configured to not locally store said provided content on said electronic processing device and to disable any screen or video capture functionalities of the electronic processing device.

16 Claims, 13 Drawing Sheets

Related U.S. Application Data continuation-in-part of application No. 15/692,019, filed on Aug. 31, 2017, now Pat. No. 10,607,035.

(51) Int. Cl.

| | |
|---|---|
| *G06F 21/84* | (2013.01) |
| *G06T 7/20* | (2017.01) |
| *G06V 10/98* | (2022.01) |
| *G06V 40/16* | (2022.01) |
| *G06V 40/20* | (2022.01) |
| *G06V 40/40* | (2022.01) |
| *G06V 40/70* | (2022.01) |
| *G10L 17/00* | (2013.01) |

(52) U.S. Cl.
  CPC ............... *G06T 7/20* (2013.01); *G06V 10/98* (2022.01); *G06V 40/172* (2022.01); *G06V 40/20* (2022.01); *G06V 40/45* (2022.01); *G06V 40/70* (2022.01); *G10L 17/00* (2013.01); *G06T 2207/30196* (2013.01)

(58) Field of Classification Search
  CPC .......... G06V 40/20; G06V 40/45; G06T 7/20; G10L 17/00
  See application file for complete search history.

(56) References Cited

U.S. PATENT DOCUMENTS

| | | | | |
|---|---|---|---|---|
| 9,626,493 | B2 * | 4/2017 | Cohen ..................... | G06F 21/10 |
| 2006/0288234 | A1 | 12/2006 | Azar et al. | |
| 2006/0291657 | A1 | 12/2006 | Benson et al. | |
| 2007/0033419 | A1 | 2/2007 | Kocher et al. | |
| 2007/0143435 | A1 * | 6/2007 | Daigle .................... | G06F 15/16 |
| | | | | 709/207 |
| 2009/0300131 | A1 | 12/2009 | Gantman et al. | |
| 2010/0058061 | A1 * | 3/2010 | Folta ........................ | G06F 21/14 |
| | | | | 713/171 |
| 2010/0124363 | A1 | 5/2010 | Ek et al. | |
| 2011/0067098 | A1 | 3/2011 | Nelson et al. | |
| 2011/0128384 | A1 | 6/2011 | Tiscareno et al. | |
| 2012/0309515 | A1 | 12/2012 | Chung et al. | |
| 2013/0067228 | A1 | 3/2013 | Dewan et al. | |
| 2013/0194301 | A1 * | 8/2013 | Robbins .................. | H04L 51/02 |
| | | | | 345/629 |
| 2013/0267204 | A1 * | 10/2013 | Schultz ................... | G06F 21/32 |
| | | | | 455/411 |
| 2014/0068740 | A1 * | 3/2014 | LeCun ................ | H04L 63/0861 |
| | | | | 726/7 |
| 2014/0133713 | A1 | 5/2014 | Kim et al. | |
| 2014/0195825 | A1 * | 7/2014 | Li, I ........................ | G06F 21/00 |
| | | | | 713/193 |
| 2014/0198958 | A1 | 7/2014 | Nathan et al. | |
| 2014/0201527 | A1 * | 7/2014 | Krivorot ............. | G06F 21/6209 |
| | | | | 713/168 |
| 2014/0366159 | A1 * | 12/2014 | Cohen ..................... | G06F 21/31 |
| | | | | 726/28 |
| 2015/0254467 | A1 | 9/2015 | Leuthardt et al. | |
| 2015/0277638 | A1 | 10/2015 | Bustamante | |
| 2015/0356286 | A1 | 12/2015 | Quirk et al. | |
| 2016/0072861 | A1 | 3/2016 | Woolsey et al. | |
| 2017/0041296 | A1 | 2/2017 | Ford et al. | |

FOREIGN PATENT DOCUMENTS

| | | |
|---|---|---|
| CN | 106650367 A | 5/2017 |
| KR | 20130104682 A | 9/2013 |

* cited by examiner

METHOD OF DISPLAYING CONTENT ON A SCREEN OF AN ELECTRONIC PROCESSING DEVICE

CROSS-REFERENCE TO RELATED APPLICATIONS

This application is a continuation of U.S. Ser. No. 16/800, 154 filed Feb. 25, 2020 which is a Continuation-in-Part application claiming priority to U.S. Ser. No. 15/692,019 filed 31 Aug. 2017, each of which is incorporated herein by reference.

FIELD OF THE INVENTION

The invention relates to a computer implemented method of receiving content at an electronic processing device and, more specifically, to a method of displaying received digital content on a screen of said electronic processing device.

BACKGROUND OF THE INVENTION

A number of social media applications are available for electronic processing devices such as smart phones, tablet computers and even personal computers (PCs) which seek to display received digital content such as photographs or videos without allowing the user to save the displayed content. One option for preventing displayed content such as a photograph or video being locally saved is to disable any functions on the device such as 'screenshot', 'screensave' or 'video capture' or the like. However, this option does not prevent a user from photographing or videoing the screen by way of indirectly saving the content locally.

In another field of endeavor, it is proposed in US2014/0366159 to protect digital content being displayed on a screen of a device by detecting when a number of viewers of the screen increases to more than one. In response to detecting multiple viewers, the display of the digital content is halted. However, the digital content being displayed is stored on the device and is accessible by other means.

There is therefore a need for an improved way of displaying digital content such that only an intended user can view it and that unauthorized saving or accessing the digital content locally is prevented.

OBJECTS OF THE INVENTION

An object of the invention is to mitigate or obviate to some degree one or more problems associated with known methods of displaying received digital content.

The above object is met by the combination of features of the main claims; the sub-claims disclose further advantageous embodiments of the invention.

Another object of the invention is to provide a system and method for displaying received content on an electronic data processing device to an authorized user but preventing said displayed content being locally saved or accessed on said device.

One skilled in the art will derive from the following description other objects of the invention. Therefore, the foregoing statements of object are not exhaustive and serve merely to illustrate some of the many objects of the present invention.

SUMMARY OF THE INVENTION

The invention provides a computer implemented method of receiving content at an electronic processing device. The electronic processing device has a data processing application. The method comprises a first step of receiving a message or invitation, said message or invitation not including the content to be received, wherein opening of the message or invitation causes the data processing application to configure a camera of the electronic processing device to capture image data. The data processing application uses image data captured by said camera of said electronic processing device to determine that a user viewing said screen is an authorized or recognized user and, in response to a positive determination, receives said content as encrypted content at said data processing application.

In response to a negative determination, the content is not received said content at said data processing application. The data processing application is also configured to not locally store said provided content on said electronic processing device and to disable any screen or video capture functionalities of the electronic processing device.

In a first main aspect, the invention provides a computer implemented method of receiving content at an electronic processing device, said electronic processing device having a data processing application configured to perform the steps of: receiving a message or invitation, said message or invitation not including the content to be received, wherein opening of the message or invitation causes the data processing application to configure a camera of the electronic processing device to capture image data; using image data captured by said camera of said electronic processing device to determine that a user viewing said screen is an authorized or recognized user; and in response to a positive determination, receiving said content as encrypted content at said data processing application; or in response to a negative determination, not receiving said content at said data processing application.

In a second main aspect, the invention provides a non-transitory computer readable medium storing machine-readable code which, when executed by a processor, causes an electronic processing device to implement the steps of the first main aspect of the invention.

In a third main aspect, the invention provides a system for displaying content on a screen of an electronic processing device, said system comprising: a first electronic processing device in communication with a second electronic processing device, said first electronic processing device configured to transmit encrypted content to a data processing application of said second electronic processing device, said data processing application configured to receive said transmitted encrypted content and to implement the steps of the first main aspect of the invention.

In a fourth main aspect, the invention provides a computer implemented method of receiving content at an electronic processing device, said electronic processing device having a data processing application configured to perform the steps of: receiving two biometric data inputs of different types or media from respective sensors of said electronic processing device; determining a degree, amount or measure of synchronization between said two biometric data inputs of different types or media; and, based on said determined degree, amount or measure of synchronization, causing one of: (i) not displaying received content on a screen of the electronic processing device; (ii) halting display of the content on said screen; and (iii) blurring the screen.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
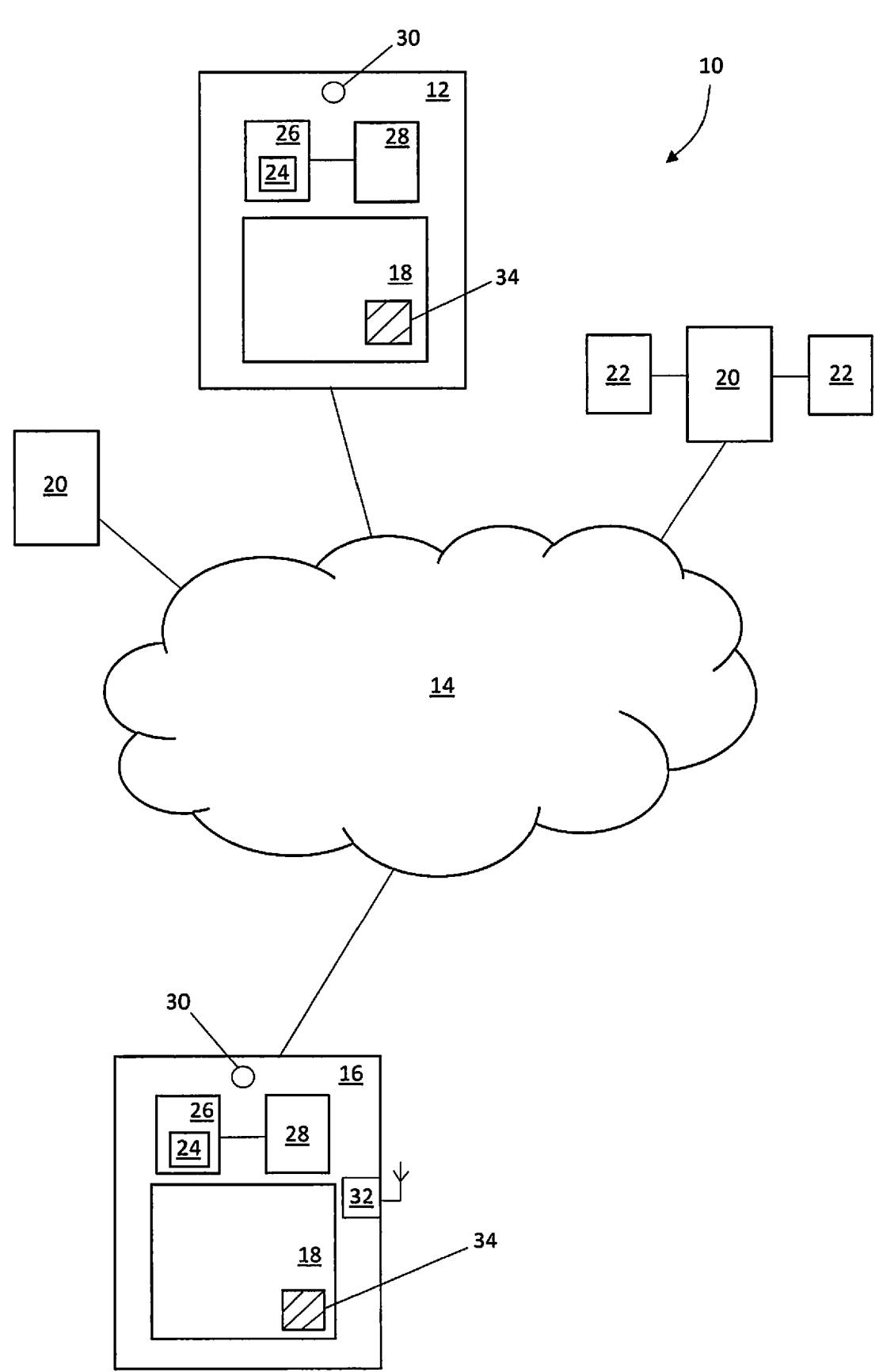
FIG. 1 is a schematic diagram of a system for displaying content on an electronic processing device.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the FIGS., may be implemented in various forms of hardware, software or combinations thereof. Preferably, these elements are implemented in a combination of hardware and software on one or more appropriately programmed general-purpose devices, which may include a processor, memory and input/output interfaces.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The method of the invention generally relates to using a biometric function such as facial recognition as a condition for continual viewing of any digital content such as an image, a document or a video, etc. on a screen of an electronic processing device such as a desktop computer, a personal computer (PC), a tablet computer, or a smart phone running any known operating system such as IOS, Android or Microsoft. The process preferably involves the continual use of facial recognition linked to the visibility of the content on the device screen. So as long as a person is determined to be looking at the document or photograph displayed on the device screen, it will remain visible to that person. However, if the person looks away, the content will cease to be shown or the screen will be blurred. The content may also cease to be shown or the screen will be blurred if, for example, more than one person's face is seen through the device's camera; this will prohibit "shoulder surfing". Furthermore, the method of the invention envisages an ability to recognize inanimate instruments such as cameras, smartphones or other equipment capable of replicating the content being displayed and to respond by again ceasing display of the content on the screen or blurring the screen.

Referring to FIG. 1 of the drawings, there is provided a system 10 comprising a first electronic processing device 12 in communication through a network 14 with a second electronic processing device 16 for displaying content on a screen 18 of said second electronic processing device 16.

The first and second electronic processing devices 12, 16 may comprise the same type of electronic processing device or different types of electronic processing device and may each comprise any of a smart phone, a tablet computer, a personal computer (PC), a desktop computer, or a server. The network 14 may comprise any of a wireless communication network such as a 4G or 5G wireless network, the internet and/or a private network such as a virtual private network (VPN) or any combination of the foregoing.

Communication of content such as digital content from the first electronic processing device 12 to the second electronic processing device 16 may be facilitated by one or more servers 20. The one or more servers 20 may also provide the function of enabling each of the first and second electronic processing devices 12, 16 to download application specific software such as an application or 'app' to configure said devices 12, 16 to implement the method as hereinafter described. The application may require a user of a device 12, 16 to become a subscriber to a content display service such that use of the service through the application is limited to listed subscribers. The content display service may be hosted on one or more of the servers 20. Where the server 20 facilitates communication of digital content from the first electronic processing device 12 to the second electronic processing device 16, the server 20 may also be provisioned with suitable application specific software including content service hosting software.

The one or more servers 20 may comprise cloud computing servers, i.e. cloud servers, and/or they may comprise dedicated application servers.

Content may comprise images such as photos or moving images such as videos, or maps, GIFs, or documents such as text documents, spreadsheets, or text messages or any other content commonly shared on social media applications or the like or commonly communicated over networks between electronic processing devices. It will be understood that the foregoing are merely examples of digital media or content which may be communicated from the first electronic processing device 12 to the second electronic processing device 16 and are not in any way limiting of the content which may be communicated between such devices. The content being communicated could also include streamed content in contrast to discrete content such as, for example, an image file.

Associated with the one or more servers 20 may be one or more databases 22, although it will be understood that the one or more databases 22 may be embodied within the servers 20. One of the databases 22 may comprise a subscriber accounts database.

In operation, at least the second electronic processing device 16, but preferably also the first electronic processing device 12, is provisioned with a data processing application 24 received in memory 26 thereof and executable by a processor 28 of said device 12,16. The execution of the data processing application 24 by the processor 28 configures the second electronic processing device 16 to receive content data transmitted to it by the first electronic processing device 12 and to receive said data by the data processing application 24. The data processing application 24 is preferably downloaded as an initial step to both the first and second electronic processing devices 12, 16 from one of the servers 20.

In the case of the second electronic processing device 16, the data processing application 24 causes said application to process data comprising the received content into a format suitable for display on the screen 18 of said device 16. The data processing application 24 is configured to monitor one or more sensors 30 of the second electronic processing device 16 to receive at least one biometric data input during display of the content on the screen 18. In response to a determination of a predetermined change in said biometric data, the data processing application 24 causes either a halting of the display of the content on the screen 18 or a blurring of the screen 18 to a degree sufficient to prevent any useful image being able to be taken of the displayed content. The data processing application 24 is configured to not locally store, and preferably also to not allow local access to, said provided content in the memory 26 of said second electronic processing device 16. Preferably, the data processing application 24 disables any screenshot or video capture functionality or the like of the device 16 for at least the duration of content being displayed normally on the screen 18 without blurring.

Preferably, the application specific data processing application 24 downloaded in an initial step to the first electronic processing device 12 configures said device 12 to communicate content for display on the second electronic processing device 16 in a protected format such as an encrypted format. The data processing application 24 of the second electronic processing device 16 is configured to extract, e.g. decrypt (i.e. unencrypt), said received content from its protected format to ready it for display on the screen 18.

It is preferred that the data processing application 24 of the second electronic processing device 16 is configured to continuously receive a stream of at least one biometric data during display of the content. The stream of at least one biometric data preferably comprises receiving image data from a camera 30 of the second electronic processing device 16 and using facial recognition software to analyze the image data to determine that a person's face is viewing the screen 18, i.e. the person is looking at the screen 18 and, by inference, is viewing the displayed content on the screen 18.

In some embodiments, the facial recognition software will be resident on at least the second electronic processing device 16 and the facial recognition process as hereinafter described will be performed locally on said second device 16. In other embodiments, the image data from the camera 30 of the second electronic processing device 16 will be transmitted to one of the servers 20 where the facial recognition process will be performed and results of such process returned to the second device 16.

Irrespective of where the facial recognition process is performed, it may include enhancements which enable a determination to be made that a person is still viewing the screen 18 of the second device 16 even when the person moves their head to some degree. This helps to reduce unnecessary interruptions in display of the content on the screen 18 where a person determined to be viewing the screen makes a modest head or eye movement, but is still viewing the screen 18. In contrast, where a person determined to be viewing the screen makes a significant head or eye movement where it can be determined that they are no longer looking at the screen 18, the data processing application 24 may cause the display of the content on the screen 18 to be halted or at least the screen 18 to be blurred such that the details of the displayed content is distorted or masked. In a further situation, where a person determined to be viewing the screen 18 makes no perceptible head and/or eye movements, the data processing application 24 may cause the display of the content on the screen 18 to be halted or at least the screen 18 blurred. This is to prevent any attempt to hold a photograph or the like within the image view of the camera 30 of the second electronic processing device 16 whilst attempting to copy or record the content displayed on the screen 18. It will be appreciated therefore that the facial recognition software could be enhanced with eye tracking software to facilitate the foregoing. In some embodiments, eye tracking software alone could be used in place of facial recognition software.

In some embodiments, it is preferred that the facial recognition process includes comparing the face of a person determined to be viewing content displayed on the screen 18 of the second device 16 to a database of authorized persons to identify that an authorized person is viewing the screen. This provides a further level of safety for the displayed content by seeking to ensure that it is viewed only by authorized users or subscribers. Furthermore, as a further check, it is preferred that other identity data is utilized to determine that the identified authorized person is also the intended recipient of the provided content. That is, that the person identified as an authorized person is also the person to whom the content was sent. The other identity data used to make this determination might include email address and/or account data associated with the second electronic processing device 16. Consequently, it is possible to not only determine that a person rather than an inanimate object such as a camera is viewing the screen 18 of the second electronic processing device 16, but that the person is an authorized subscriber and furthermore that the authorized subscriber is the intended recipient for display of the content. It will be understood that the facial recognition program may require access to facial data of authorized users/subscribers as will be hereinafter described.

In the method, a predetermined change in the biometric data may comprise using the facial recognition software and/or eye tracking software to determine any one or any combination of the fact that two or more persons are determined to be viewing the screen 18, or the disappearance from the electronic processing device's camera image view of a person determined as viewing the screen 18, or a significant head or eye movement of a person determined as viewing the screen 18, or a lack of any perceptible movement of a person determined as viewing the screen 18, or the recognition or detection of inanimate objects such as cameras or electronic devices within the electronic processing device's camera image view and/or within range of a short range radio module 32 of the second electronic processing device 16, or the absence of other biometric data inputs. The short range radio module 32 may detect through, for example, a Bluetooth™ connection the presence of other electronic devices which may be used to copy or record content being displayed on the screen 18. The data processing application 24 may be configured to receive signals from the short range radio module 32 and, in response, to cause the display of the content on the screen 18 to be halted or at least the screen 18 blurred. One example of other biometric data that can be used in addition to facial recognition or eye tracking data is fingerprint data whereby a person using the second device 16 is required to place a finger on a specified fingerprint detecting portion 34 of the screen 18 or body of the second electronic processing device 16. In such an arrangement, the person may be required to continuously hold their finger on the fingerprint detecting portion 34 to enable content to be displayed. Consequently, it may be necessary for authorized subscribers to provide fingerprint data.

In the method, the facial recognition software may be enhanced to detect movements, gestures and/or expressions of the person determined as viewing the screen. Any such movements, gestures and/or expressions may be used continue to show the provided content on the screen and/or to provide data indicative of the person's reaction to the viewed content or a portion of the viewed content. The facial recognition process may gather information on human reaction through gestures to determine the viewer's reaction to displayed digital content. That is to say, by streaming the facial recognition data while the viewer such as an authorized recipient reads or watches content, it will be possible to determine which part or parts of, for example, an image is being viewed and possible to provide analytical information to the sender of the content. By way of example, if a fashion designer sent out ten photographs of a new dress design, each with a slight variation in colour or style, it could be determined which one the viewer liked the best through facial gestures and possibly eye movements such as pupil dilation, etc.

It is also envisaged that the method could include applying a time limit to view the provided content, said time limit preferably being applied from a first viewing of said content.

It is also envisaged including a limit on a number of times provided content can be opened.

More specifically, the foregoing and further features of the method herein disclosed can be better understood from the following description of flowcharts showing the process flow of the method by way of example only.

Figure 2:
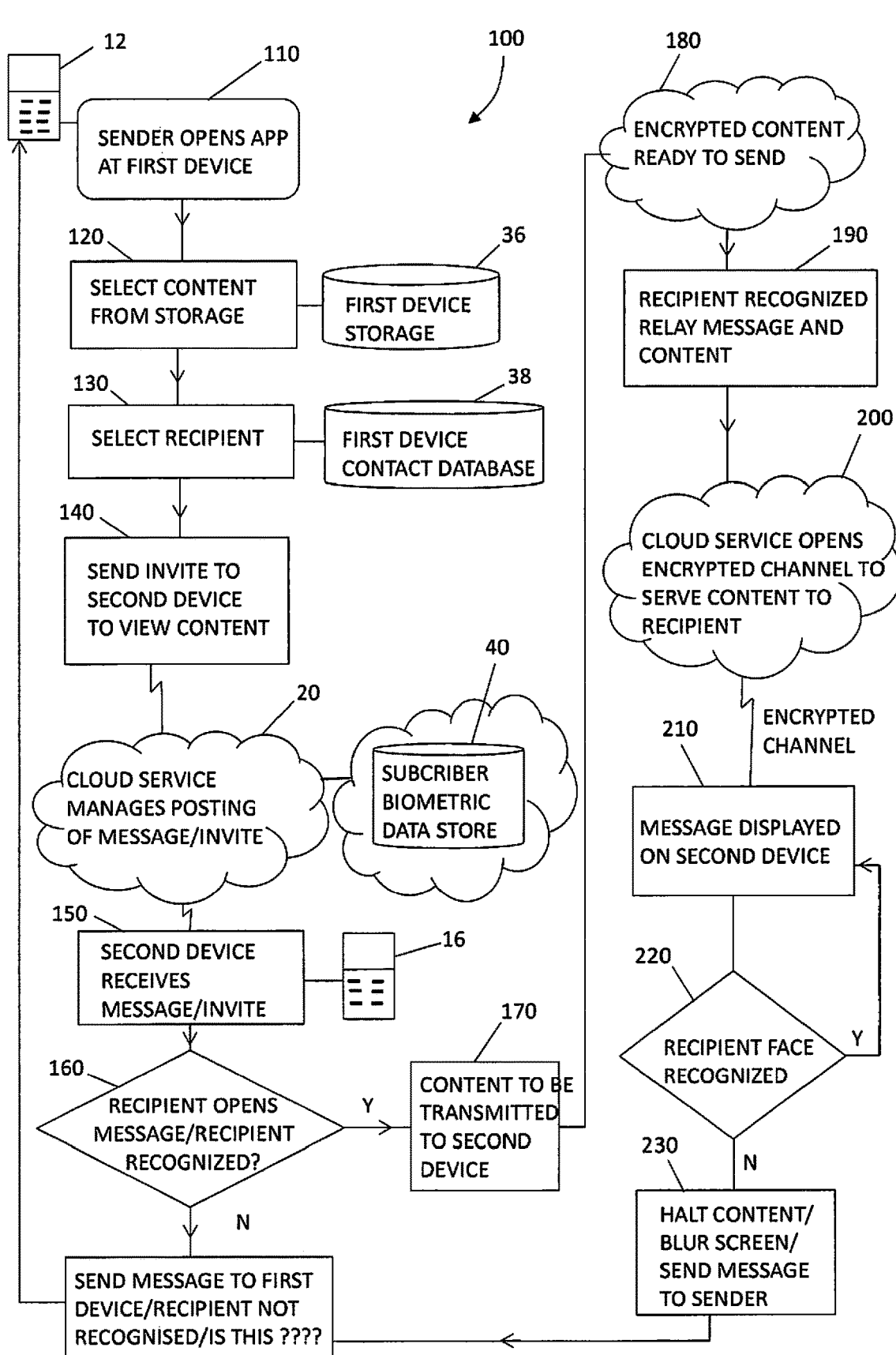
FIG. 2 is a flow chart showing the process for sending content from a first electronic processing device for viewing at a second electronic processing device.

Referring to FIG. 2, shown is the content flow process 100 for sending content from the first electronic processing device 12 via the server 20 for viewing at the second electronic processing device 16.

In a first part 110 of the process 100, the content sender opens the data processing application 24 (hereinafter referred to as the content service application 24) on the first device 12. The opened content service application 24 configures the first device 12 to enable the sender to select 120 digital content from any of the memory of the device 12, an associated storage device 36 or even from the server 20 or a database associated with the server 20 where said content is intended to be only displayed to a recipient at the second device 16. The content selection step 120 may include previewing the selected content on the first device 12. In a next step 130, the sender selects a recipient from a first contact device database 38. This may comprise selecting an address for the recipient such as an email address, although other address mechanisms can be utilized. In a following step 140, a message or invitation is sent to the second device 16 alerting the recipient to an invitation to view some content. At this point, no content has been sent to the second device 16. The invite message is preferably sent via the server 20 which manages posting of messages and invitations. The server 20 has associated with it a subscriber biometric database 40.

In a next step 150, the second device 16 receives the message/invitation to view some content and the recipient opens the message/invitation. This causes the content service application 24 on the second device 16 to configure the camera 30 of the second device 16 to record images in an attempt to at least determine if a person is viewing the screen 18 of the second device 16 and more preferably that an authorized person who is also the intended recipient is the person determined as viewing the screen 18. In a decision step 160, if the determination is negative, the second device 16 is caused to send a message back to the first device 12 indicating that the person viewing the screen 18 of the second device 16 is not recognized. This message may also include a captured image of the person viewing the screen 18 of the second device 16 asking the sender if they recognize said person. At this point, no content has been sent to the second device 16. Although not shown in the flowchart 100, if, upon receiving the negative determination message, the sender indicates that they recognize the person viewing the screen they may override the negative determination at step 160 to, in effect, invoke a positive determination at this decision step 160. This may be so even if the sender, although recognizing the person viewing the screen 18, recognizes that the person viewing the screen is not the intended recipient. This enables the sender to still have the content viewed by someone they accept as being closely associated with the intended recipient.

Once a positive determination at decision step 160 is made or the sender invokes a positive determination in response to an initial negative determination i.e. overrides the initial negative determination, the process moves forward to the step 170 of sending the content to be displayed/viewed from the first device 12 to the second device 16. However, the content is not sent directly from the first device 12 to the second device 16. The content is first placed in a protected format such as being encrypted. This may occur at the first device 12 or at the server 20. The server 20 may also check 180 to ensure that the content is indeed in a protected format ready for sending. The process may include the step 190 of informing the server 20 that the recipient is recognized. In any event, the server 20 opens 200 an encrypted (protected format) channel to deliver the protected format content to the second device 16. A further message may be displayed 210 on the second device 16 to alert the recipient to receipt of the protected format content. The receipt of the protected format content at the second device 16 causes the content service application 24 to ensure the device's camera 30 is operating to capture images and to process the protected format content ready for display on the screen 18. In response to a periodic, but preferably continuous positive determination 220 by the facial recognition software and/or the eye tracking software or other biometric input software that the recipient is viewing the screen 18, the device 16 displays the content on said screen 18 in accordance with the method hereinbefore described. At any time where there is a change in the incoming biometric data from the camera and/or other sensors 30, the content service application 24 may halt 230 display of the content or blur the screen 18. The content service application 24 is configured to prevent or disable any function on the second device 16 which would enable a user of the device 16 to copy or record content being displayed in the screen and also to prevent or disable any function which would enable a user of the second device 16 to access or store in memory a copy of the unencrypted content. The content service application 24 will also halt display of the content or blur the screen 18 if there is a negative determination at decision point 220 for any reason.

Figure 3:
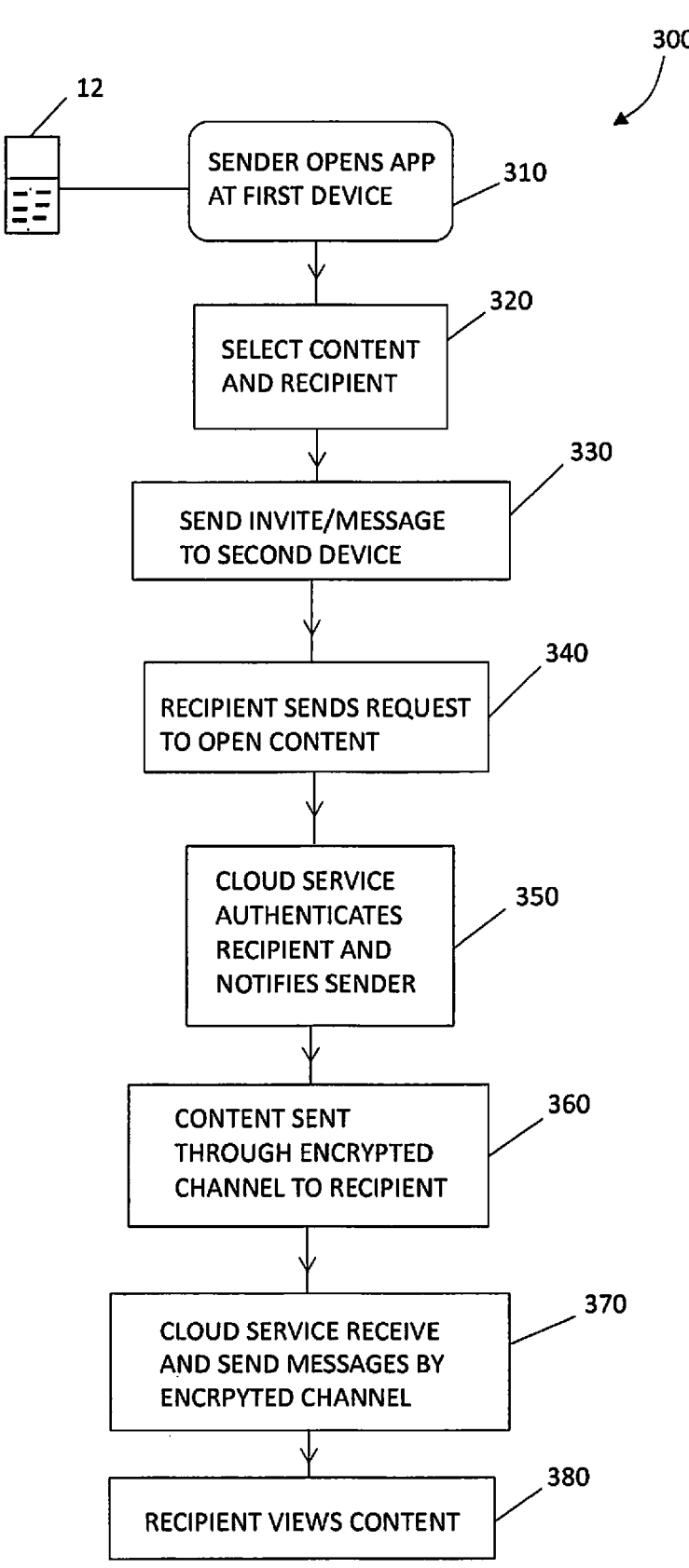
FIG. 3 shows in more detail the process for user authentication for the process of FIG. 2.
Figure 4:
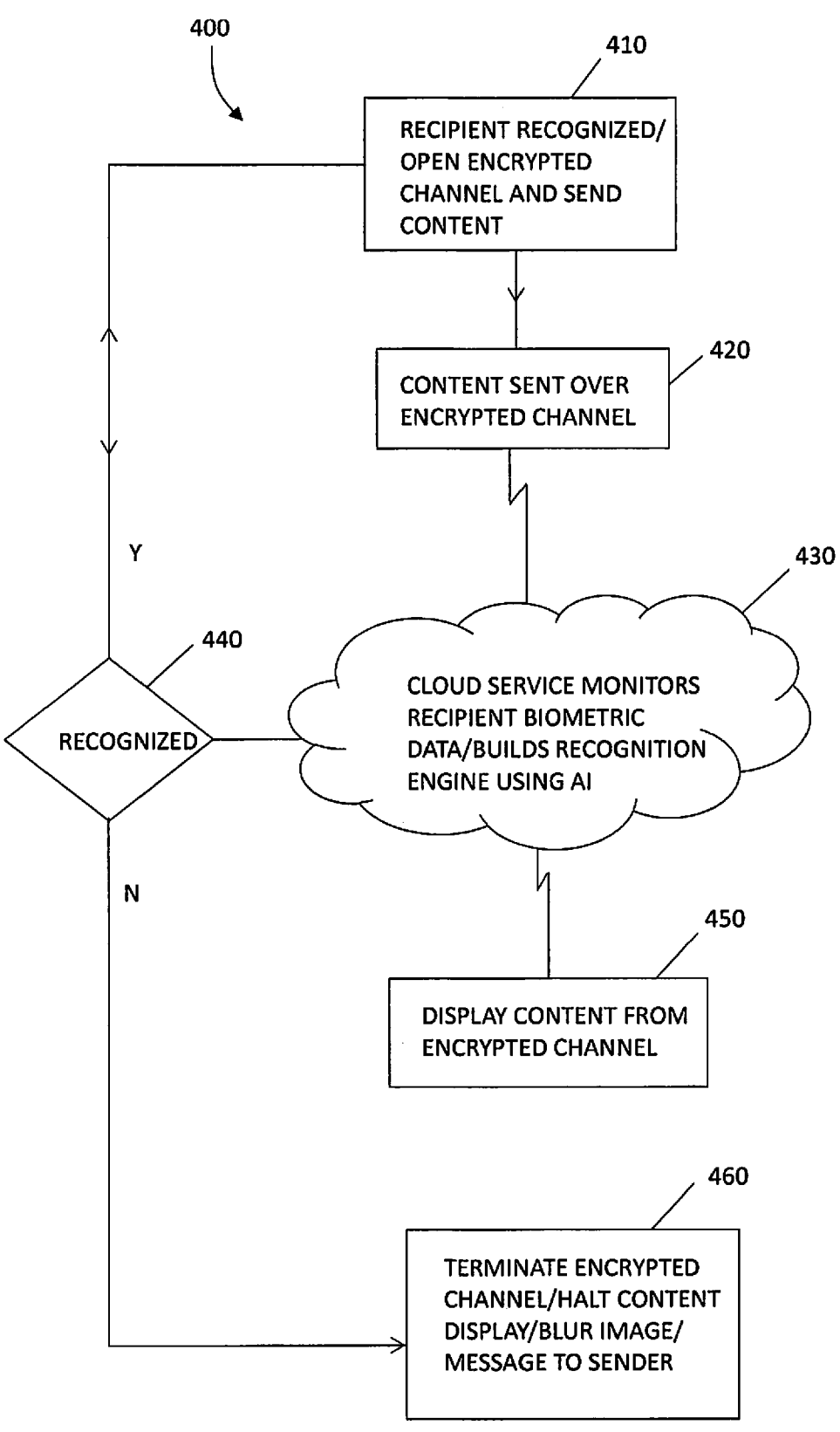
FIG. 4 shows in more detail the process for sending content via a server to the second electronic processing device.

Referring to FIGS. 3 and 4, shown in more detail in FIG. 3 is the process 300 for user authentication and shown in more detail in FIG. 4 is the process for sending content via the server 20.

In a first part 310 of the process 300, the content sender opens the content service application 24 on the first device 12. The opened content service application 24 configures the first device 12 to enable the sender to select in a step 320 digital content and a recipient for such content. In a following step 330, a message or invitation is sent to the second device 16 alerting the recipient to an invitation to view some content. At this point, no content has been sent to the second device 16. The invite message is preferably sent via the server 20 which manages posting of messages and invitations. In a next step 340, the second device 16 sends a request to open the content, although the content has not yet been received at the second device 16. In response to the request message from the second device 16, the server 16 authenticates 350 the recipient and notifies the sender in the manner hereinbefore described. The content is then sent 360 through the encrypted channel established by the server 20 to the second device 16. Any messages and/or data flows exchanged between the first and second devices 12, 16 and the server 20 are managed 370 by the server 20 through the encrypted channel. The recipient is then able to view 380 the content on the second device 16 as hereinbefore described.

In the process 400 depicted by FIG. 4, once a recipient is recognized, the server (cloud service) 20 opens an encrypted channel and sends the content over said channel to the second device 16. The server 20 receives 430 biometric data such as image data from the second device in order to periodically or continuously re-determine who is viewing the screen 18 of the second device 16 in accordance with the method hereinbefore described. The server 20 may also build a recognition engine using artificial intelligence (AI) to more efficiently process image data to make said determination more efficiently. In the event that the recipient is no longer recognized at decision point 440, the encrypted channel may be terminated 460 and the display of content at the second device halted or the screen 18 blurred. Furthermore, a message may be sent to the sender. Where the recipient remains recognized, the content is displayed 450.

Figure 5:
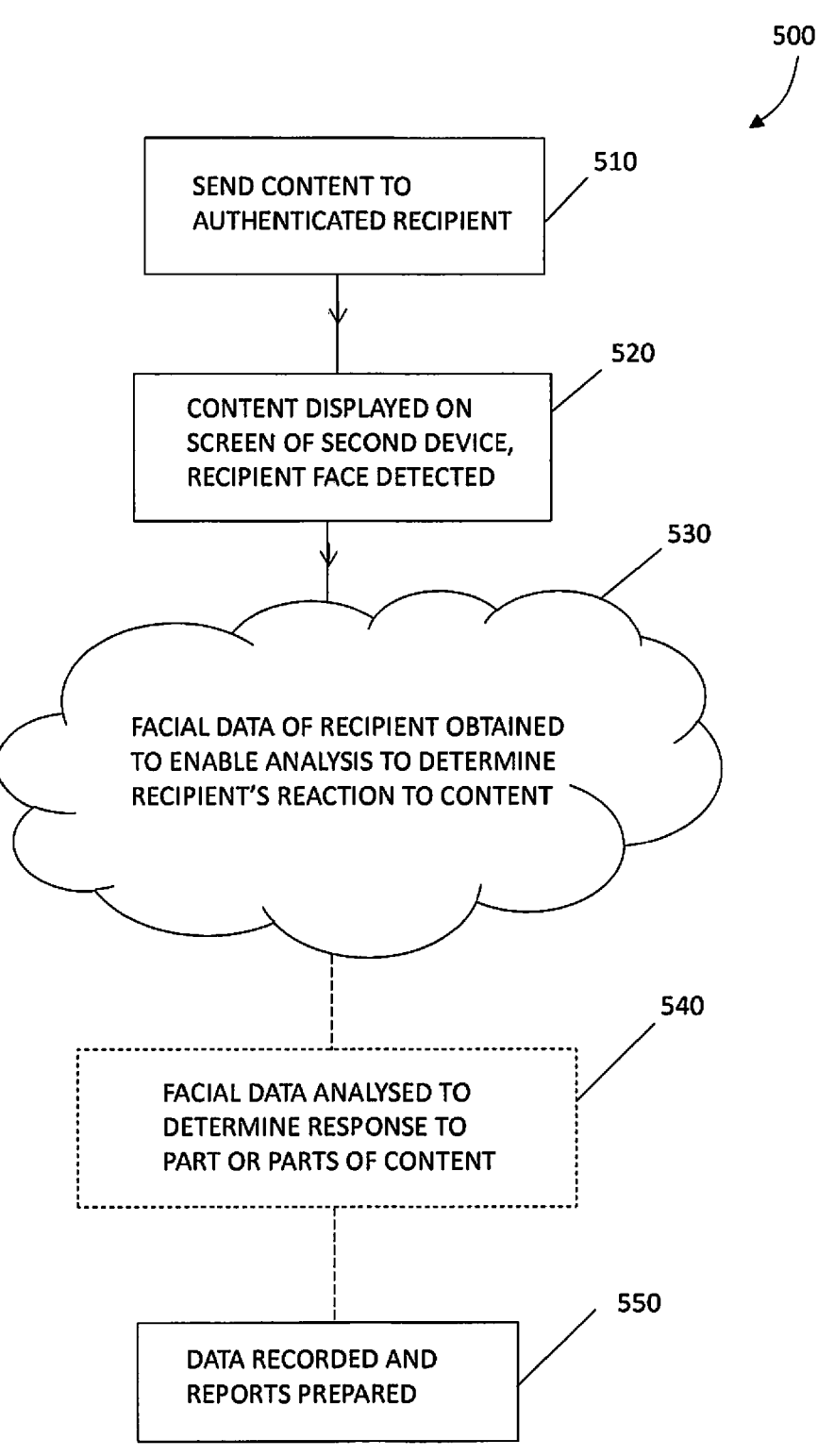
FIG. 5 shows a process for determining a recipient's reaction to all or part of displayed content.

FIG. 5 shows a process 500 for determining a recipient's reaction to all or part of displayed content. In a first step 510, the content to be displayed to the recipient is provided as hereinbefore described to the second device 16.

As before, the content is displayed 520 on the screen 18 of the second device and the camera 30 of said device 16 is activated to capture image data within the field of view of said camera 30. The captured image data is used to maintain display of the content as also hereinbefore described, but said data may also be processed 530 using the facial recognition software and/or the eye tracking software to identify movements, gestures and expressions of the recipient as a means of determining the recipient's reaction to the viewed content. In an optional step 540, the image data may be processed for only a part or parts of the content. In either case, the processing of the image data to detect movements, gestures and/or expressions of the recipient may be used to provide feedback or reports 550 to the sender of the content or others which informs the sender or others of the recipient's reaction, e.g. acceptance or refusal, of the content or a part of the displayed content.

The foregoing and further features of the method herein disclosed can additionally be better understood from the following description of process diagrams showing how users of the method open accounts with the content service application system (FIG. 1), prepare content to be displayed, and display received content, merely by way of example.

Figure 6:
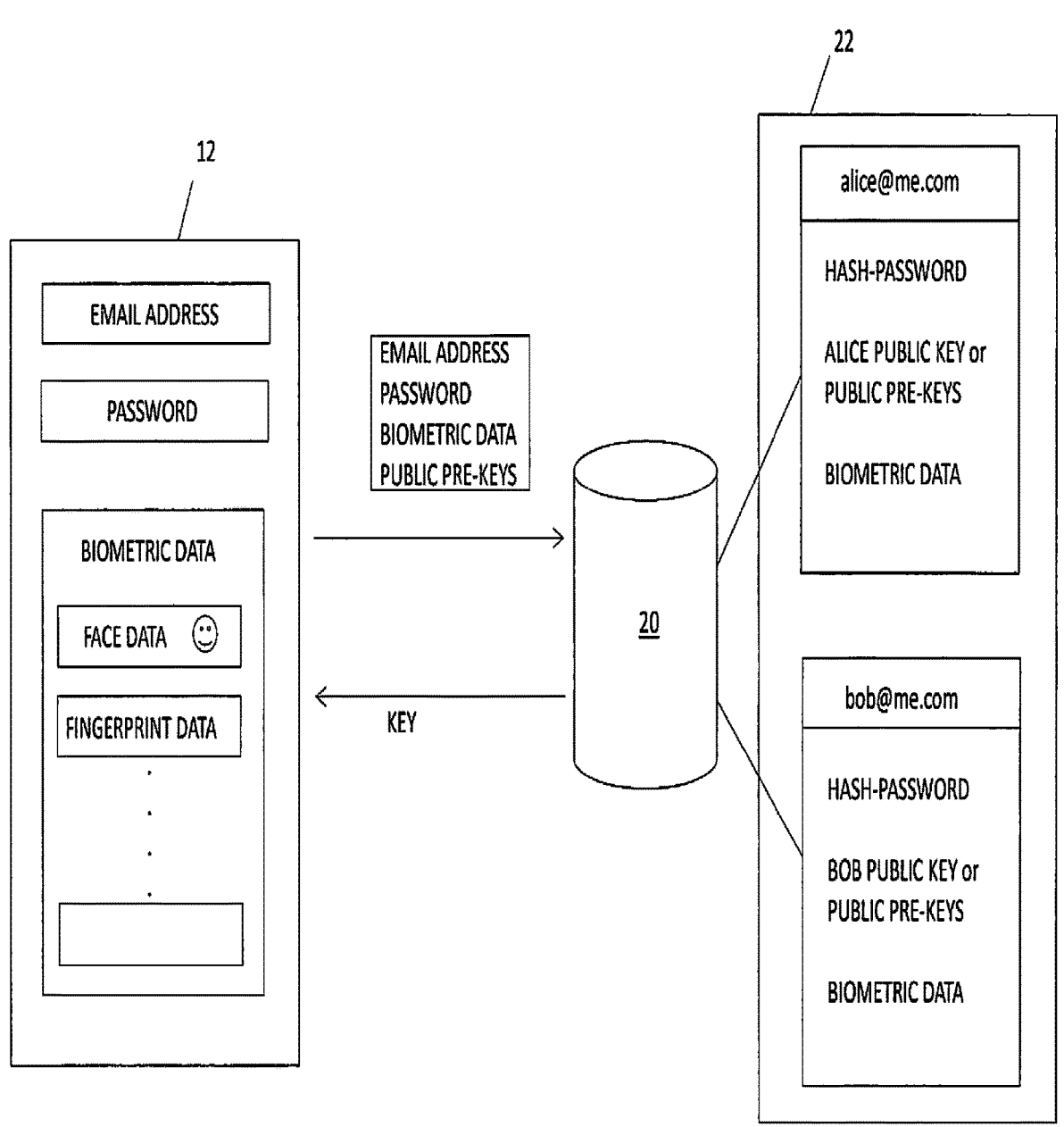
FIG. 6 shows a process for a user to download the content services application and to create an account.

FIG. 6 shows a process for a user to download the content services application and to create an account. By way of example, a sender named Alice uses her electronic processing device 12 to establish a subscriber account with the server 20. In an initial step, the content services application 24 is downloaded to Alice's device 12 if it has not already been downloaded to her device 12. Once the content services application 24 is operable on Alice's device 12, she uses her device 12 to connect to the server 20 to set up a subscriber account. In an account set up page displayed on her device 12, Alice is required to enter her address, a password and optionally to arrange for her biometric data to be sent to the server 20. The server may store account data for subscribers in an associated account database 22. It can be seen in FIG. 6 that Bob also has set up a subscriber account. The biometric data may comprise a facial image of Alice and fingerprint data. This may be obtained through use of the camera 30 on her device 12 and a fingerprint detection part 34 of her device's screen 18, although it will be understood that such data may be provided by other means and from other sources. It will also be understood that a subscriber may be asked for other forms of identification data such as telephone numbers residential addresses, etc. In response to setting up a subscriber account, Alice's device 12 receives a private encryption key from the server 20.

Figure 7:
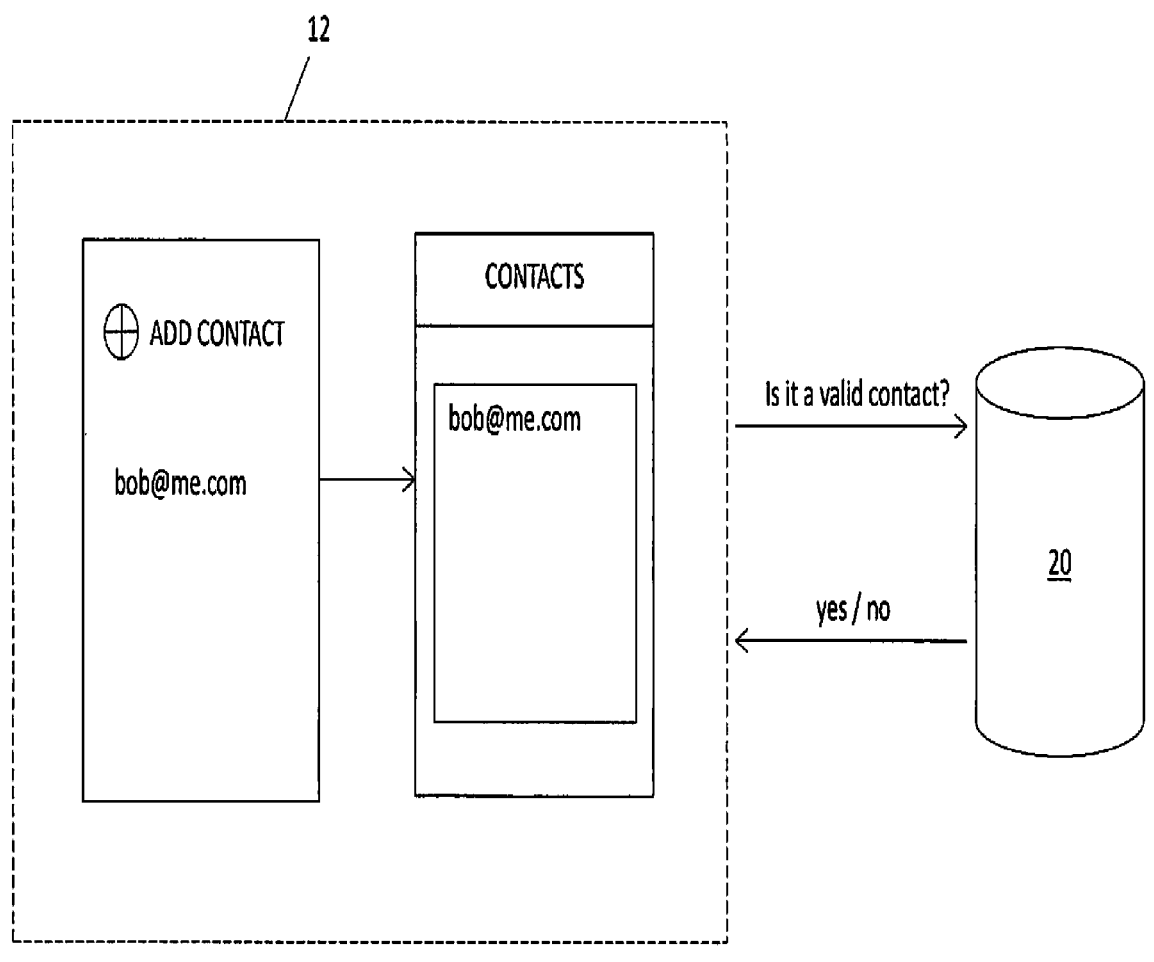
FIG. 7 shows a process for a user to add a contact to their account.

FIG. 7 illustrates the adding of contacts to a user's subscriber account. In the example shown, Alice knows Bob and wishes to add him as a contact for receiving content from her for display on his electronic processing device 16. In an 'add contacts' window on her device 12, Alice can search for and find Bob's contact details and then request that his contact details be added to her subscriber account. The server 20 receives a request from Alice's device 12 to add Bob's contact details and, in response, determines whether or not Bob's contact details match an existing subscriber. In the case that there is a match, the server 20 may add Bob's contact details to Alice's subscriber account and returns an affirmative message to Alice's device 12. The server 20 may also send a message to Bob's device 16. Additionally, or alternatively, Bob's device 16 may be configured to interact with the request from Alice's device 12 to enable him to be added to her contacts. For example, the request from Alice's device may include an image of Alice as the requestor. Bob can then view the requestor's image and, if the image does not match with Alice, then Bob may deny the contact request. In the case that Bob does recognize Alice's image, he may approve the contact request. An approval of a contact request may, in addition to adding the contact to the requester's contact list, adds a positive recognition/trustfulness feedback to the requester.

Figure 8:
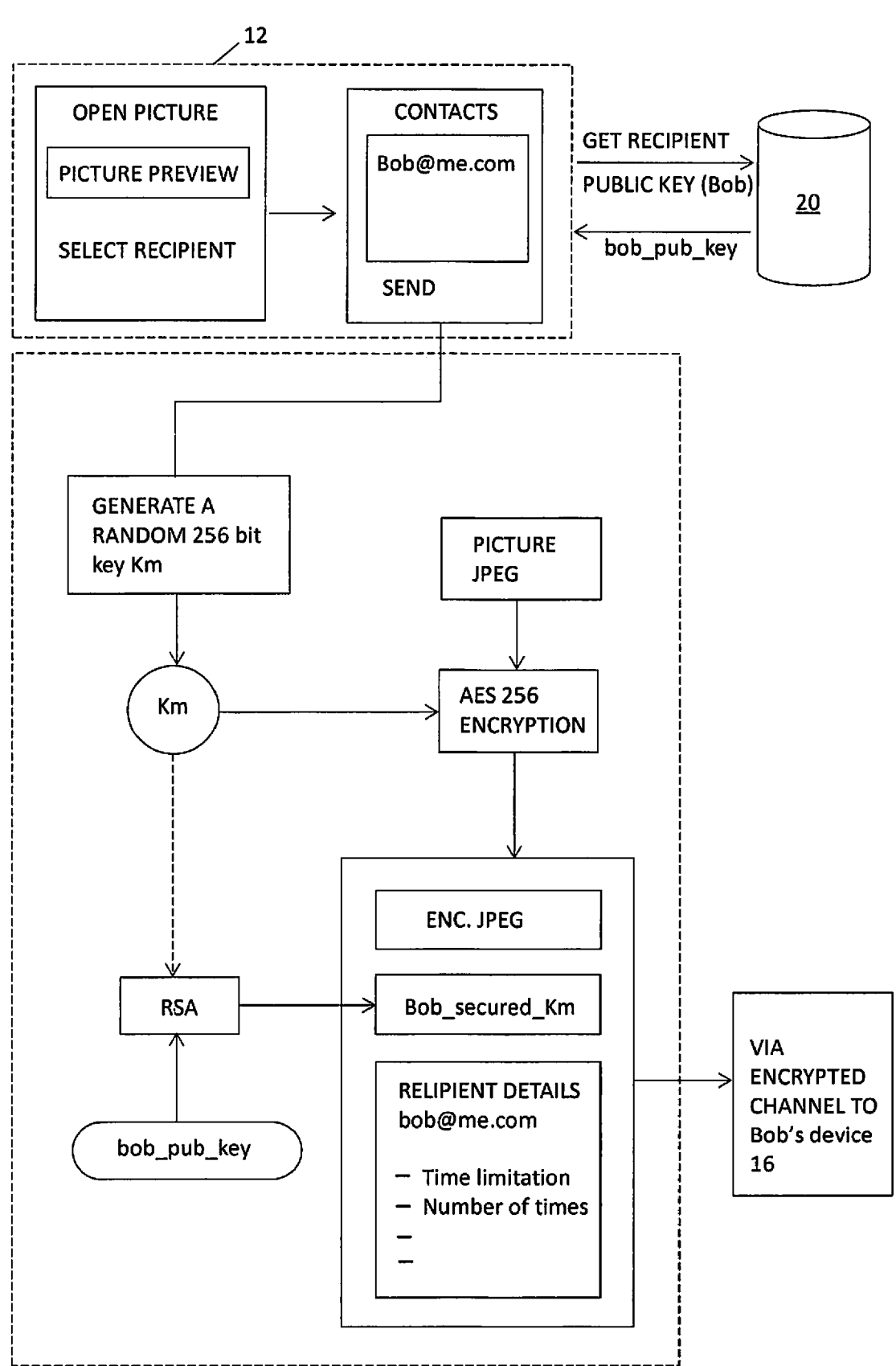
FIG. 8 shows a process for a user to prepare content to be send to a contact.

Referring to FIG. 8, shown is one method of sending content from a first device 12 to a second device 16 for display thereon. Using the foregoing example, Alice utilizes the content service application 24 on her device 12 to select content such as a picture to send to a recipient. In this example, Alice selects Bob as the contact to receive the content. Once the content and recipient are selected, Alice's device 12 connects to the server 20 to request Bob's public encryption key. Then, Alice's device 12 generates a random 256 bit key Km and uses this with AES 256 encryption to encrypt the selected picture (JPEG) data. Alice's device also uses the random 256 bit key Km with Bob's public key (bob_public_key) using RSA encryption to generate a decryption key for Bob (bob_secured_Km). The encrypted picture data (ENC. JPEG), the decryption key (bob_se-cured_Km) and any other content display conditions such as a limit on numbers of times the content can be opened and a time limit from first viewing are transmitted to the server 20 via the encrypted channel set up by the server 20 in readiness for sending to Bob's device 16. Consequently, the Km (encryption/decryption) key is securely wrapped, i.e. encrypted, using Bob's public key. This is to allow only Bob to decrypt the Km key using his private key. The decryption key for the JPEG data is always Km for all recipients, but it can be used, i.e. unwrapped/decrypted, by the recipients only using their respective private keys. If the key is leaked, only the recipients can decrypt it and consequently decrypt the JPEG data using the Km key. It will be understood that RSA is a known public-key cryptographic algorithm, but that any secure public-key cryptographic algorithm can be used to secure the encryption key Km.

Figure 9:
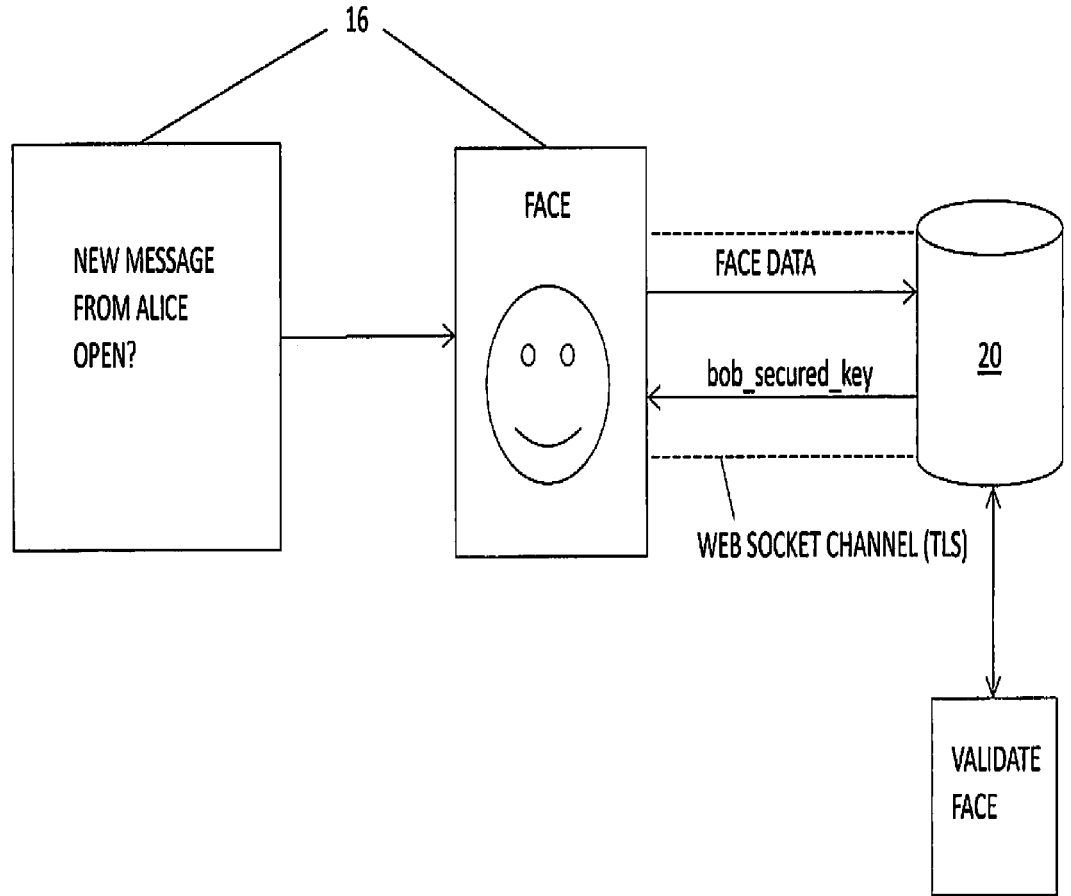
FIG. 9 shows a process for a contact to display received content.

As seen in FIG. 9, once Bob receives and opens Alice's message inviting him to view the picture, the content service application 24 on Bob's device 16 activates the camera 30 to capture image data. The captured image data is sent to the server 20 to enable it to carry out the user authentication process as hereinbefore described. On validating the image data, the server forwards the encrypted picture data (ENC. JPEG), the decryption key (bob_secured_Km) and any other content display conditions to Bob's device 12. The data is transferred with the bob_secured_key on the same channel once the face recognition engine validates Bob's face data. The content service application 24 on Bob's device uses the decryption key (bob_secured_Km) to decrypt the picture data to display it on the screen 18. Continued display of the picture on the screen is in accordance with the method hereinbefore described. Whilst the face recognition engine is described as being hosted on the server 20, it will be understood that, in some embodiments, it can be provided on the users' devices 12, 16. In the example of FIG. 9, the face recognition engine may be provided by the content service application 24 on Bob's device 16 such that, once the camera on Bob's device 16 has captured his image, the face recognition engine on his device 16 sends a validation message to the server 20 that Bob's image is recognized. In response, the server 20 then forwards the data with the bob_secured_key on the same channel to Bob's device 16.

As an alternative to using public key encryption, the encryption and decryption keys to encrypt and decrypt messages are generated on the fly at users' devices 16 using only public pre-keys stored on the server 20 for each user. The content service application 24 generates and sends these shared public pre-keys to the server 20. These keys can be used to initialize an asynchronous message exchange with another user, for example, Alice can be offline when Bob sends a message to her. When using public/private keys as described for FIG. 9, "Bob_secured_key" is downloaded from the server 20 when the recipient's biometric data is authenticated. However, in the alternative where, in FIG. 9, public pre-keys are being used rather than public/private keys, the decryption keys are generated on the recipient's device 16 only after the recipient's biometric data is authen-ticated. This is because only the recipient's device 16 can decrypt messages, i.e. generate the decryption keys. The server 20 stores public pre-keys that, if compromised, are not enough to decrypt messages without the remaining private pre-keys on the recipient's local device 16.

Content may be sent to a group of subscribers, but preferably only viewed individually on their respective devices, although the sender may be able to define a group of individuals who can view content simultaneously on the same device. The content will never be stored permanently on the recipient device, but will be uploaded from the sender and encrypted at the point of sending and decrypted within the application on the recipient's device. Furthermore, the server may be arranged to not store any transmitted content thereby ensuring complete integrity of all content.

In some embodiments, the content sender maintains full control of the content even after the content has been sent and even if the receiving device is offline. In this arrange-ment, the encrypted content is stored on the server until the receiving device accesses the content and downloads it to the data processing application thereon for viewing for the first time. At this point, the server may delete the content from the server storage and the content remains for a time on the receiving device. However, the sender can retain full control of the content by conditioning the messages associ-ated with the sending of the content such that such messages cause the server to store the content until the sender decides to delete it, manually or automatically after a specific period of time, e.g. a predetermined period of days. Where the receiving device accesses and downloads the content from the server as afore-described herein, the content is decrypted by the data processing application at the receiving device and presented on the screen. It may then be removed from the receiving device when the recipient closes the data processing application and/or stops viewing the content such that the content is, in effect, never stored on the receiving device. This allows the sender to delete the content from the server even when the receiving device is not connected to internet as the receiving device does not retain the content on the receiving device.

The method constantly monitors the recipient face or faces and compares them with stored facial data in a cloud server or local database. Constant monitoring may comprise continuous or periodic monitoring. Here, constant monitor-ing of biometric data such as facial recognition data is used to grant continual access to displayed content within the boundaries hereinbefore described.

One problem which the method of the invention addresses through constantly monitoring the biometric data such as facial recognition data to ensure that the intended recipient is the only one viewing the displayed content is to carefully control constant monitoring in a manner which prevents or at least reduces jitter between a clear display of the content and a blurred display of the content. Such jitter between clear and blurred display of the content would degrade the user experience. Therefore, to assure that the recipient is correctly repeatedly identified and yet at the same time to reduce or prevent jitter, it is preferred to use the facial recognition software to intermittently scan the face of the recipient viewing the displayed content. The rate of inter-mittent scanning of the recipient's face may be every 0.25 seconds, although other time intervals may be applied depending on the type of second electronic processing device 16 being viewed by the recipient. Intermittent scan-ning of the recipient's face reduces the likelihood of a negative output from the facial recognition software which might occurs during continuous scanning of a face when light changes on the scanned face or the like causes resetting of the facial recognition parameters resulting in a momen-tary negative determination.

As described above, content may be sent from one elec-tronic processing device 12 to another electronic processing device 16 in a one to one connection. Or, content may be sent between a group of electronic processing devices 12, 16, for example, between a group of subscribers and this may be achieved through a group chat hosted by one or more of the servers 20 through the content service application 24 on the subscribers' electronic processing devices 12, 16. In a group chat, each subscriber may be both a sender of content and a recipient of content. Each subscriber can access content for viewing on their respective devices 12, 16 in accordance with the methods hereinbefore described such that said content is sent in an encrypted format and is decrypted by the content service application 24 on the recipient device. The group chat will also be an encrypted service hosted in at least one of the servers 20, preferably as a Cloud service such that the components of the chat are all held in the Cloud and not locally on any of the devices 12, 16. The group chat content is therefore encrypted in the Cloud and then sent from the Cloud and decrypted when each recipient/subscriber requests the chat content using an encryption key held on the recipient's device as hereinbefore described. If any participant in either a one to one connec-tion or a group chat decides to erase either a single message, attachment or total message string/content, the message, attachment or total message string/content is instantly deleted such that it can no longer be viewed on any recipient device. This ensures that the sender of content always has control of the message content such that, if they decide that they want to delete it, then at any time they can instantly delete it and the message content instantaneously deletes from the recipient's message history which is also held in the Cloud.

Preferably, one of the subscriber devices 12, 16 in a group chat is enabled to set geo-location parameters for either the whole group chat or to assign a geo-location restriction to each subscriber device within the group chat, or to apply several geo-locations to the whole or individual devices within the group chat, e.g. "office 1, 2, 3" and "home locations". Preferably, this feature is implemented by an administrator of the group chat. This feature enables exact location or locations as to where the group chat can be displayed i.e. an office location, a specific address, a city area or region. This unique feature enables the originator of content and/or the administrator to determine where the content can be displayed to the intended recipients.

Figure 10:
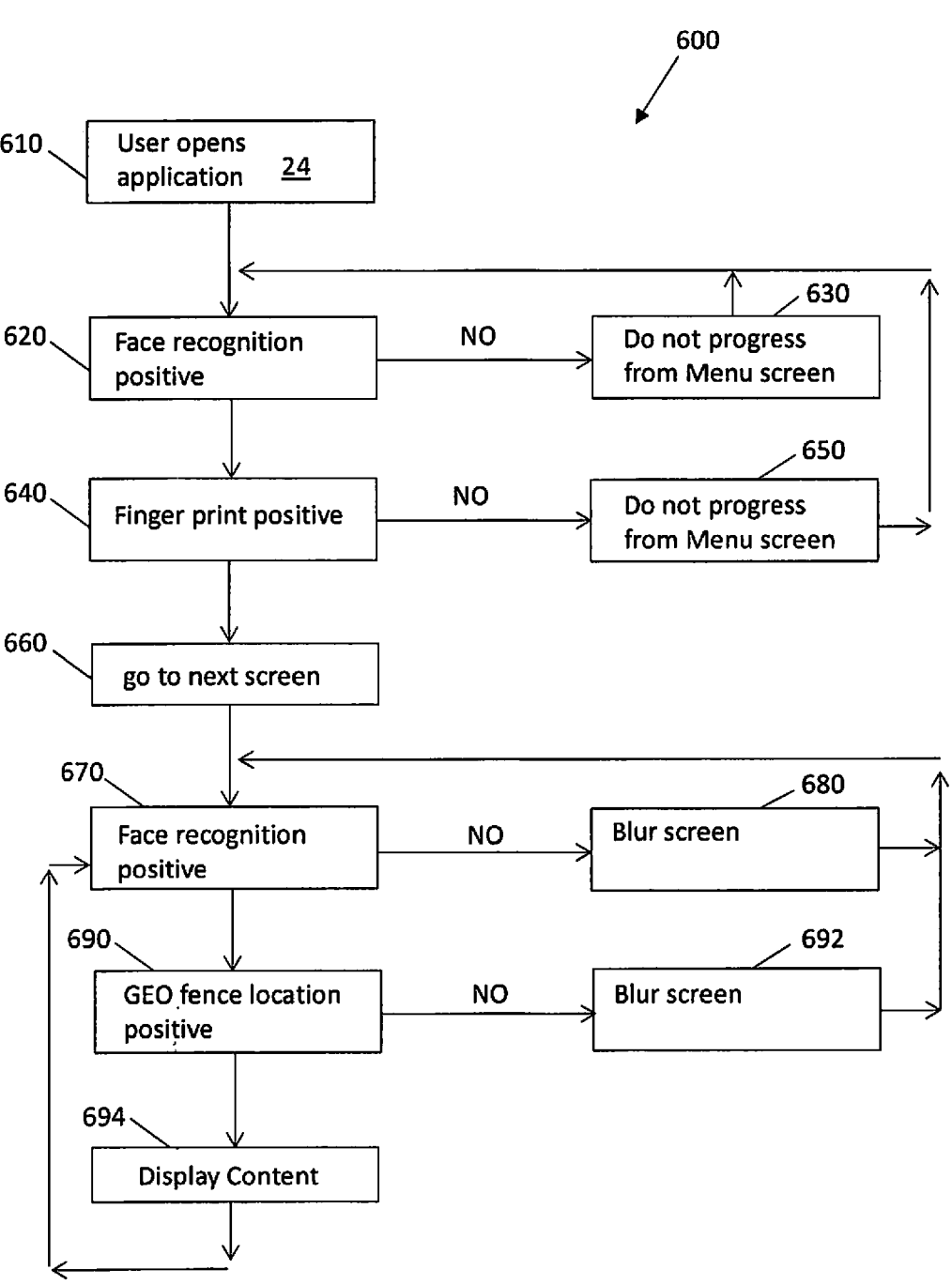
FIG. 10 shows a process for using geo-location data in a group chat.

This feature is preferably used in combination with the biometric data before displaying the content as illustrated by FIG. 10 which illustrates a process 600 of using one or more geo-location restrictions to display content in a group chat where the first half of the process 600 comprises the recipi-ent authentication process and the second half of the process 600 comprises the content display process augmented with one or more geo-location restrictions.

In FIG. 10, at step 610, the user or recipient operates their electronic processing device 16 to open the content service application 24 to enter a menu screen. Whilst at the menu screen, the facial recognition software at step 620 deter-mines if a viewer of the electronic processing device 16 is the intended recipient or an acceptable recipient and, if no, at step 630, the viewer is prevented from progressing beyond the menu screen. If yes, then in an optional step 640, other biometric data such as finger print data may be used further authenticate the viewer as the intended recipient or an acceptable recipient and, again if no, at step 650, the viewer is prevented from progressing beyond the menu screen. If yes, then at step 660, the recipient is admitted to the next screen for display of content to be displayed. At step 670, facial scanning is constantly employed, preferably, intermit-tently, to confirm the presence of intended recipient or an acceptable recipient viewing the screen of the electronic processing device 16, but, if a negative determination is made, then at step 680 the screen is blurred or the content is no longer displayed. If a positive determination is made at step 670, then at step 690 geo-location restriction data associated with content to be displayed is checked against a location of the electronic device 16 and, if a negative determination is made, then at step 692 the screen is blurred or the content is no longer displayed. If a positive determi-nation is made at step 690, then at step 694 the content is displayed and at least step 670 is intermittently applied.

In an alternative or additional arrangement of process 600, the geo-location checking step 690 may be included or duplicated in the recipient authentication part of the process 600 whereby, if a negative determination is made on check-ing the one or more geo-location restrictions, the recipient is prevented from progressing from the menu screen.

Process 600 enables a content sender and/or a group chat administrator to condition a message, person or group chat to only be able to open the content comprising any of a message, chat or attachment when a recipient's device is within a specific pre-set geo-location. This implementation requires more than one unique condition in parallel to be met before the content can be displayed. For example, this requires positive constant face recognition and geo-location to be satisfied. It is possible to add further conditions such as a one-time code validation before content display. This might comprise a challenge response one time password (OTP) generation that is triggered by, for example, authen-tication of a recipient's fingerprint data. The end result is that the recipient can only display the content if he is within the geo-location, is identified using the face recognition soft-ware, has positive determination of finger print data, and correctly implements an OTP is from a challenge response system.

The method may also include augmenting the face rec-ognition software to track movement of fixed points on the face and registering movement in one or more directions such as left and/or right. The recipient would be requested their head left, right, up or down as a random challenge.

Content ownership is a critical aspect of the method of the invention such that no form of saving, forwarding or copying of content is permitted. For example, the screenshot capability is disabled for a period of time. This is easily implemented in Android based electronic processing devices, but is not so easily implemented in iOS based devices where is it not presently possible to disable the screenshot feature as the operating system does not allow this to be done. Therefore, for iOS based devices, where a user attempts to screen shot a message screen or attachment, the method may include the immediate deletion of the message and advising the content sender and/or group chat administrator that the specific recipient has attempted a screen shot.

Figure 11:
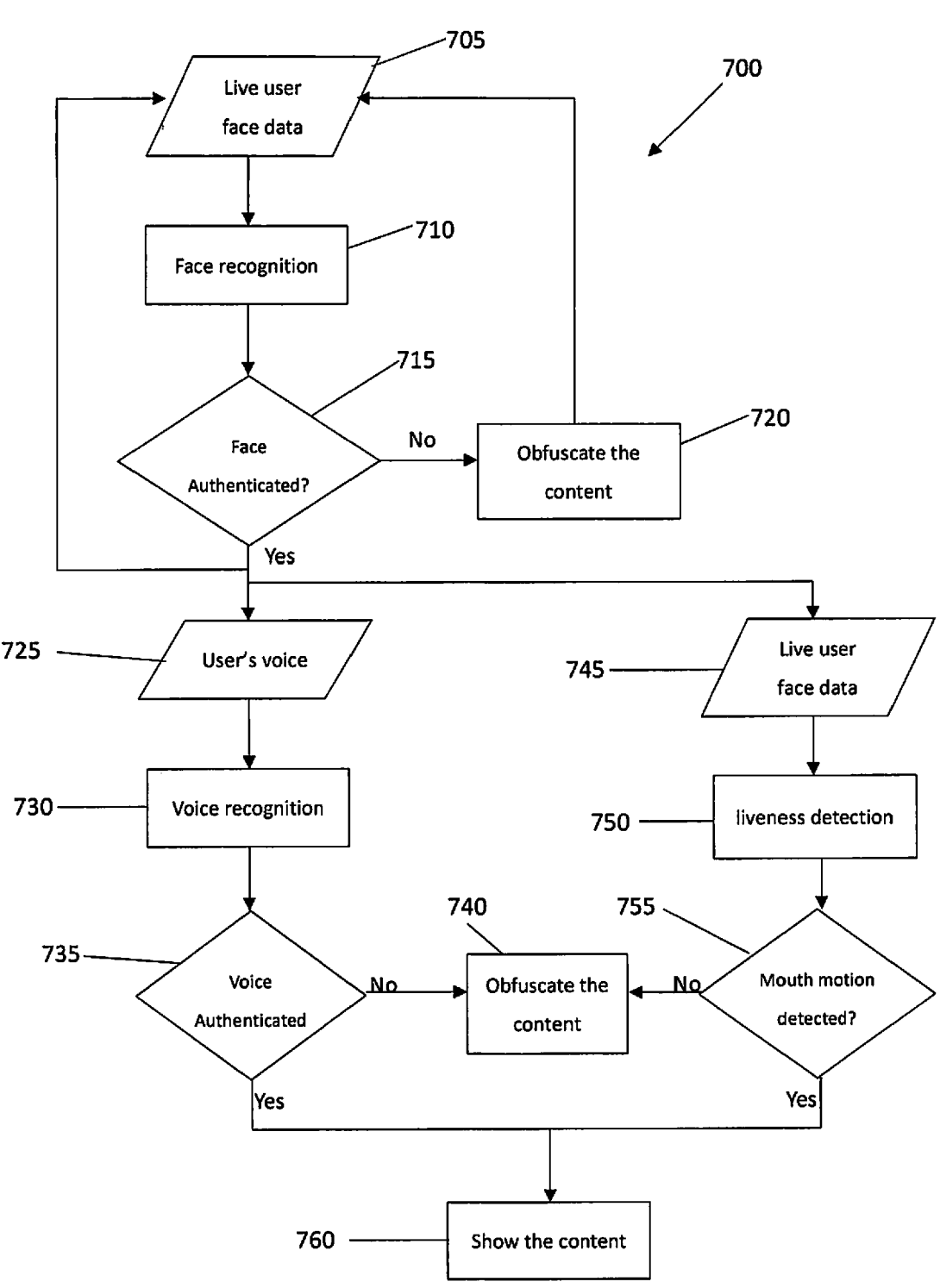
FIG. 11 shows a process of using two biometric data inputs of different type or media for user authentication.

FIG. 11 shows an enhanced process 700 for authenticating a user once content is being displayed on the screen of the electronic processing device 16. The process 700 can be used to enhance the process 600 of FIG. 10 starting at step 670 thereof, although it is not limited to the process of FIG. 10.

A first set of steps of process 700 comprises step 705 of receiving image data from the camera 30 of the electronic processing device 16 and, at step 710, using facial recognition software to determine if a viewer of the electronic processing device 16 is the intended recipient or an acceptable recipient. If, at decision box 715, a negative determination is made, then, at step 720, the data processing application halts display of the content on the screen of the electronic processing device 16 or blurs, i.e. obfuscates, the display of said content. However, if, at decision box 715, a positive determination is made from the received image data that a user viewing the camera is the intended recipient or an acceptable recipient, the process 700 enters an enhanced part of the authentication process comprising second and third sets of steps which are preferably run in parallel but may be run serially or as interleaved processes. The first set of steps therefore comprises steps 705, 710, 720 and decision box 715.

The second set of steps of the enhanced process 700 starts at step 725 where data of a first type or media is received by the data processing application from a suitable sensor on the electronic processing device 16. In this embodiment, the data of a first type or media comprises audio data from a microphone on the electronic processing device 16 which is intended to capture the intended recipient or the acceptable recipient's voice. Although not shown in FIG. 11, step 725 may include a prompt displayed on the screen of the electronic processing device 16 to cause the intended recipient or the acceptable recipient to speak. The prompt may include text which the intended recipient or the acceptable recipient is requested to speak into the microphone. The prompt may include already user recorded words or phrases for the intended recipient or the acceptable recipient to say. At step 730, the data processing application uses voice and/or speech recognition software to authenticate the intended recipient or the acceptable recipient's voice. At decision box 735, if a negative determination results from step 730, then, at step 740, the data processing application halts display of the content on the screen of the electronic processing device 16 or blurs the display of said content. If, at decision box 735, a positive determination results from step 730, the data processing application may, at step 760, display or continue to display the content on the screen of the electronic processing device 16. The second set of steps therefore comprises steps 725, 730, 740, 760 and decision box 735.

The third set of steps of the enhanced process 700 starts at step 745 where data of a second different type or media is received by the data processing application from a different sensor on the electronic processing device 16. In this embodiment, the data of the second type or media comprises image data from the camera on the electronic processing device 16 which is intended to capture the intended recipient or the acceptable recipient's image. At step 750, the data processing application processes the image data to authenticate that the intended recipient or the acceptable recipient is alive, i.e. moving in some manner. In this embodiment, it is preferred to focus on facial movements and, in particular, the user's mouth to identify or recognize mouth movements, but other facial movements and/or gestures may be utilized. At decision box 755, if a negative determination results from step 750, then, at step 740, the data processing application halts display of the content on the screen of the electronic processing device 16 or blurs the display of said content. If, at decision box 755, a positive determination results from step 750, the data processing application may, at step 760, display or continue to display the content on the screen of the electronic processing device 16. The third set of steps therefore comprises steps 745, 750, 740, 760 and decision box 755.

It will be understood that, in some embodiments, for display or continuing display of the content, it is preferred that positive determinations are required from both decision boxes 735 and 755.

The second and third sets of steps of process 700 are preferably run in parallel, but the sets of steps may be run serially or by interleaving said steps. In any event, the data processing application may be configured to show or continue to show, at step 760, the content on the screen of the electronic processing device 16 when both the second and third sets of steps return a positive determination or when only one of said second or third sets of steps returns a positive determination. The former is, however, preferred as it strengthens, i.e. enhances, the authentication necessary to maintain display of content on the screen of the electronic processing device 16.

In some embodiments, the first set of steps of process 700 may be omitted leaving only the second and third steps of steps for enhanced authentication of a user. Alternatively, one or both of the second and third steps may be run in parallel with the first set of steps rather than after said first set of steps is run as shown in FIG. 11.

In a further enhancement of the process 700, the second and third sets of steps may be combined such as to enable the audio data and the image data to be processed such that a determination is made of a degree, amount or measure of synchronization between said detected mouth movements of the intended or accepted recipient and recognized speech of said intended or accepted recipient and, based on said determined degree, amount or measure of synchronization, causing one of: (i) displaying or continuing to display the content; (ii) halting display of the decrypted content; or (iii) blurring the screen to obfuscate the content. A degree, amount or measure of synchronization between said detected mouth movement and recognized speech may be obtained from configuring the data processing application to run lip synching software which matches mouth shapes to spoken words.

In some embodiments the face recognition (first set of steps of process 700) is performed continuously or periodically with the voice recognition (second set of steps of process 700) and the liveness detection (third set of steps of process 700). Any negative determination at any of decision boxes 715, 735 or 755 preferably leads to halting display of the decrypted content or blurring the screen to obfuscate the content.

The data processing application is preferably configured to initiate the microphone of the electronic processing device to capture audio data in response to receipt of a message of invitation in a similar manner to the capture of image data from the camera.

It will be appreciated that the enhanced process 700 of FIG. 11 requires that a user provides voice and image data at the time of account registration or enrolment, i.e. during a set-up phase of the data processing application. Voice data and image data may be provided during account creation (FIG. 6) or could be provided after account creation but must be done prior to active use of the application as otherwise a received invitation will lead to a negative determination regarding the user. Providing voice data may comprise a user repeating a displayed predefined message or string of words from which the data processing application being configured to derive voice data patterns and/or characteristics for subsequent use by the voice and/or speech recognition software.

Figure 12:
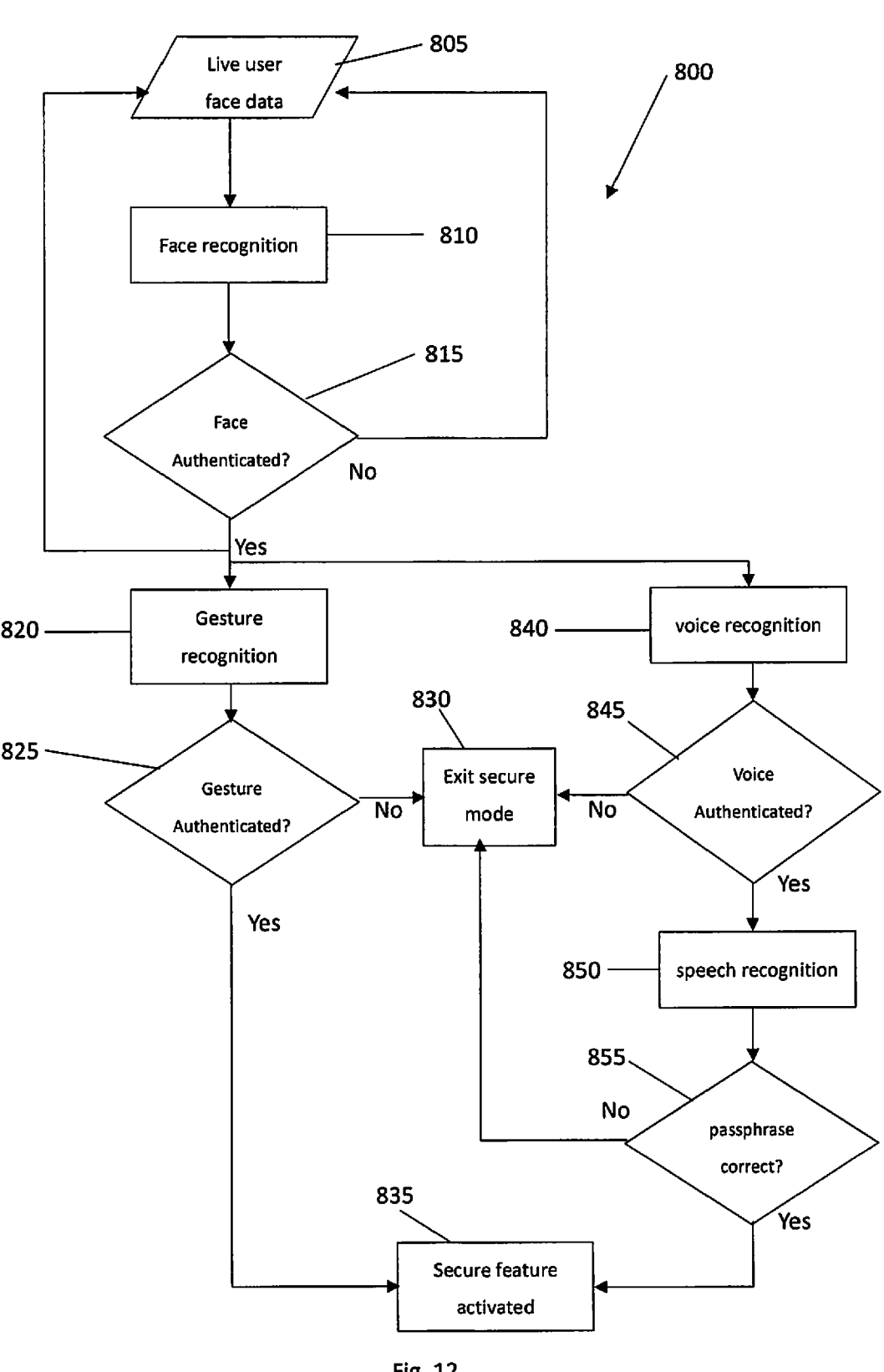
FIG. 12 shows a process for manually accessing security features and/or settings of the data processing application.

In a further enhancement of the method of the invention, FIG. 12 shows a process 800 for enabling a user to access or activate the data processing application security features and/or settings using gestures and/or a spoken passphrase, password or other spoken code.

A first set of steps of process 800 comprises step 805 of receiving image data from the camera 30 of the electronic processing device 16 and, at step 810, using facial recognition software to determine if a viewer of the electronic processing device 16 is the intended recipient or an acceptable recipient. If, at decision box 815, a negative determination is made, then the process may return to step 805 or be terminated. However, if, at decision box 815, a positive determination is made from the received image data that a user viewing the camera is the intended recipient or an acceptable recipient, the process 800 enters an enhanced part of the security features access process comprising second and third sets of steps which are preferably run in parallel but may be run serially or as interleaved processes. The first set of steps therefore comprises steps 805, 810 and decision box 815.

The second set of steps of the enhanced process 800 starts at step 820 where image data from the camera on the electronic processing device 16 is again received. At step 820, the data processing application processes the image data to identify gestures made by the intended recipient or the acceptable recipient. In this embodiment, it is preferred to focus on facial gestures. At decision box 825, if a negative determination results from step 820, then, at step 830, the data processing application exits a secure mode of the application thereby preventing access to the security features and/or settings. If, at decision box 825, a positive determination results from step 820, the data processing application may, at step 835, allow access to the application security features or settings. The second set of steps therefore comprises steps 820, 830, 835 and decision box 825.

The third set of steps of the enhanced process 800 starts at step 840 where audio data from a microphone on the electronic processing device 16 is received. Although not shown in FIG. 12, step 840 may include a prompt displayed on the screen of the electronic processing device 16 to cause the intended recipient or the acceptable recipient to speak. The prompt may include text which the intended recipient or the acceptable recipient is requested to speak into the microphone. However, it is preferred that the prompt requests the user to provide, by speaking into the microphone, a passphrase, password or other code known only to the user. At step 840, the data processing application uses voice recognition software to recognize the user's voice. At decision box 845, if a negative determination results from step 840, then, at step 830, the data processing application exits a secure mode of the application thereby preventing access to the security features and/or settings. If, at decision box 845, a positive determination results from step 840, the data processing application, at step 850, uses speech recognition software to determine what was spoken by the user. At decision box 855, if a negative determination results from step 850, then, at step 830, the data processing application exits a secure mode of the application thereby preventing access to the security features and/or settings. If, at decision box 855, a positive determination results from step 850 in which the user's spoken passphrase, password or other code is authenticated, the data processing application may, at step 835, allow access to the application security features or settings. The third set of steps therefore comprises steps 840, 850, 830, 835 and decision boxes 845, 855.

It will be appreciated that step 840 and decision box 845 may be optional such that the third set of steps commences at step 850 rather than at step 840, i.e. the voice recognition step and decision may be omitted from the process.

It will be understood that, in some embodiments, for access to the security features and settings, it is preferred that positive determinations are required from at least decision boxes 825 and 855.

The second and third sets of steps of process 800 are preferably run in parallel, but the sets of steps may be run serially or by interleaving said steps. In any event, the data processing application may be configured to allow access to said security features or settings when both the second and third sets of steps return a positive determination or when only one of said second or third sets of steps returns a positive determination. The former is, however, preferred as it strengthens, i.e. enhances, the access to security features or settings of the data processing application on the electronic processing device 16.

In some embodiments, the first set of steps of process 800 may be omitted leaving only the second and third steps of steps for enhanced security mode access. Alternatively, one or both of the second and third steps may be run in parallel with the first set of steps rather than after said first set of steps is run as shown in FIG. 12.

In some embodiments the face recognition (first set of steps of process 800) is performed continuously or periodically with the gesture recognition (second set of steps of process 700) and the voice/speech recognition (third set of steps of process 800). Any negative determination at any of decision boxes 815, 825 or 845/855 preferably leads to exiting of the secure mode.

It will be appreciated that the enhanced process 800 of FIG. 12 requires that a user provides gesture data and passphrase/password/code data at the time of account registration or enrolment, i.e. during a set-up phase of the data processing application. Gesture and passphrase/password/code data may be provided during account creation (FIG. 6) or could be provided after account creation but must be done prior to accessing the application's security features and/or settings.

The process 800 of FIG. 2 may be used to access other features and/or settings of the data processing application and not just security features and/or settings.

Figure 13:
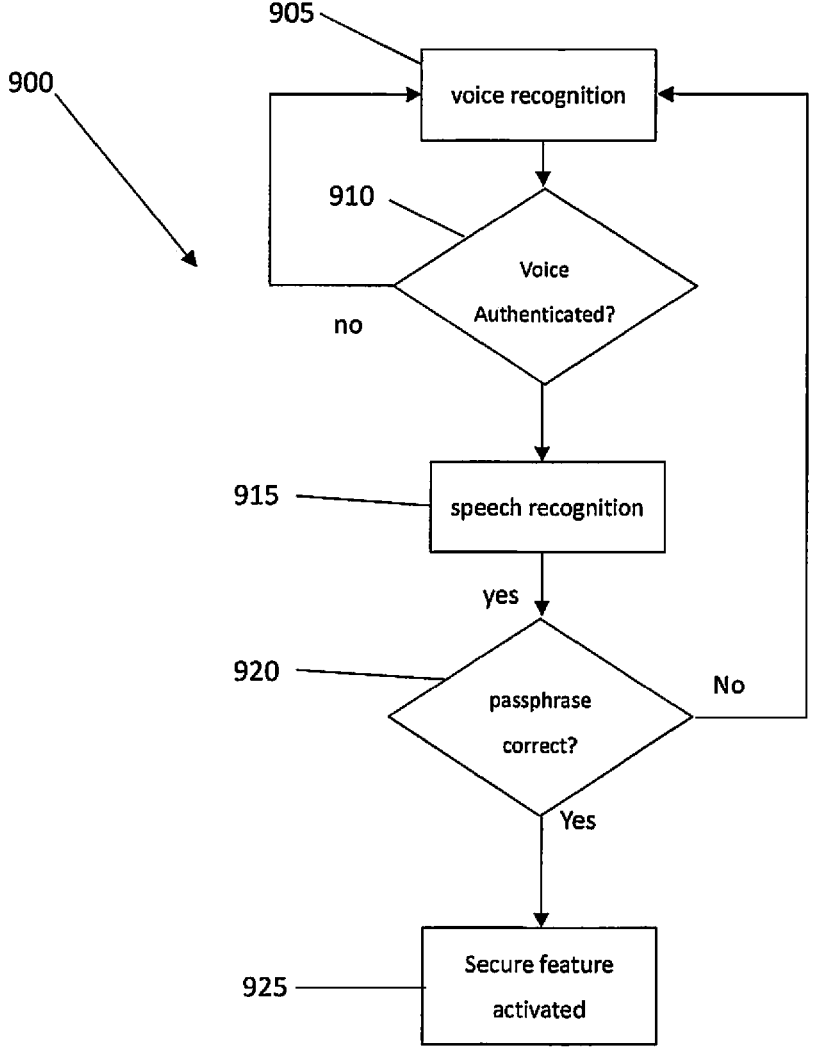
FIG. 13 shows a process for automatically accessing security features and/or settings of the data processing application.

FIG. 13 shows a process 900 for automatically accessing security features and/or settings of the data processing application. In this process, the first set of steps of process 800 is not repeated but could be included.

Process 900 commences with step 905 where audio data from a microphone on the electronic processing device 16 is received. Although not shown in FIG. 13, step 905 may include a prompt displayed on the screen of the electronic processing device 16 to cause the intended recipient or the acceptable recipient to speak. The prompt may include text which the intended recipient or the acceptable recipient is requested to speak into the microphone. However, it is preferred that the prompt requests the user to provide, by speaking into the microphone, a passphrase, password or other code known only to the user. At step 905, the data processing application uses voice recognition software to recognize the user's voice. At decision box 910, if a negative determination results from step 905, then the data processing application may return to step 905 or exit the secure mode of the application thereby preventing access to the security features and/or settings. If, at decision box 910, a positive determination results from step 905, the data processing application, at step 915, uses speech recognition software to determine what was spoken by the user. At decision box 920, if a negative determination results from step 915, then the data processing application may return to step 905 or exit the secure mode of the application thereby preventing access to the security features and/or settings. If, at decision box 920, a positive determination results from step 915 in which the user's spoken passphrase, password or other code is authenticated, the data processing application may, at step 925, allow access to the application security features or settings.

It will be appreciated that step 905 and decision box 910 may be optional such that process 900 commences at step 915 rather than at step 905, i.e. the voice recognition step and decision may be omitted from the process.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A computer implemented method of displaying content on a screen of an electronic processing device, wherein a data processing application of said electronic processing device is configured to perform the steps of:
upon a user opening a message or invitation to view content received by said data processing application, said content being encrypted, causes the data processing application to configure a camera and/or sensor of the electronic processing device to capture biometric data;
monitoring the camera and/or sensor of the electronic processing device to receive a biometric data input;
using the biometric data input to locally determine that a user viewing the screen is an authorized or recognized user and, if yes, in response to a positive determination, decrypting the encrypted content into a format suitable for display on said screen of said data processing application;
causing display of the decrypted content on said screen only after the user is authorized or recognized;
storing the decrypted content locally in a memory of the electronic processing device only during display of the decrypted content on the screen; and
receiving a continuous stream of the biometric data input and continuously reverifying the biometric data input to continue to display the decrypted content;
wherein the data processing application is configured when executing to disable any function of said electronic processing device which would enable a user of the electronic processing device to make a copy from the memory of the decrypted content stored therein; and
the data processing application is configured when closing to delete said decrypted content in the memory of the electronic processing device.

2. The method of claim 1, comprising the steps of:
causing: (i) halting display of the decrypted content on said screen; or (ii) blurring display of the decrypted content on said screen in response to a determination of a predetermined change in said received biometric data;
wherein the predetermined change in said received biometric data comprises any of: determining that the authorized or recognized user of said electronic processing device is looking away from the camera, or determining that the authorized or recognized user of said electronic processing device has make no perceptible head and/or eye movements, or determining that two or more users' faces are detected by the camera, or an interruption in receipt of a continuous stream of said received biometric data.

3. The method of claim 1, wherein a predetermined change in said biometric data comprises an interruption in receipt of a continuous stream of said received biometric data where said received biometric data comprises a fingerprint of the authorized or recognized user detected at a specified fingerprint detecting portion of the screen.

4. The method of claim 3, wherein the decrypted content is displayed only during continuous detection of the authorized or recognized user's fingerprint.

5. The method of claim 1, wherein said biometric data comprises continuously tracking the authorized or recognized user's eye movement and a change in said biometric data comprises an interruption in the detection of the user's eye movement.

6. The method of claim 1, wherein the data processing application is configured to disable any screenshot or video capture functionality of the electronic processing device for at least the duration of the display of the decrypted content on the screen.

7. The method of claim 1, comprising the steps of:

displaying the decrypted content during periodic or continuous detection of the authorized or recognized user's biometric data;

capturing image data of the authorized or recognized user during display of the decrypted content;

using the image data to determine movements, gestures and/or expressions of the authorized or recognized user's face; and determining the authorized or recognized user's reaction to the displayed decrypted content from the movements, gestures and/or expressions.

8. The method of claim 1, the method including causing one of: causing: (i) halting display of the decrypted content on said screen; or (ii) blurring display of the decrypted content on said screen in response to a determination of a predetermined change in said received biometric data.

9. The method of claim 8, including the step of processing the image data from the electronic processing device's camera to detect movement, gestures and/or expressions of the person determined as viewing the screen.

10. The method of claim 9, including the step of using any detected movement, gestures and/or expressions of the person determined as viewing the screen to continue to display the decrypted content on the screen and/or to provide data indicative of the person's reaction to viewed decrypted content.

11. The method of claim 10, wherein a predetermined change in said biometric data comprises any one or any combination of: determining that two or more persons are viewing the screen; the disappearance from the electronic processing device's camera image view of a person determined as viewing the screen; a significant movement of a person determined as viewing the screen; a lack of any perceptible movement of a person determined as viewing the screen; the recognition or detection of non-biological objects such as cameras or electronic devices within the electronic processing device's camera image view or within range of the electronic processing device's short range radio module; and the absence of other biometric data inputs.

12. The method of claim 11, wherein authentication of the authorized or recognized user comprises detecting facial movement of the authorized or recognized user to determine that the authorized or recognized user is a live user.

13. The method of claim 1, wherein the step of receiving at least one biometric data input during display of the decrypted content comprises receiving image data from the camera of the electronic processing device and using facial recognition software to analyze the image data to determine that a person's face is viewing the screen.

14. A non-transitory computer readable medium storing machine-readable code which, when executed by a processor, causes a data processing application of said electronic processing device to implement the steps of:

upon a user opening a message or invitation to view content received by said data processing application, said content being encrypted, causes the data processing application to configure a camera and/or sensor of the electronic processing device to capture biometric data;

monitoring the camera and/or sensor of the electronic processing device to receive a biometric data input;

using the biometric data input to locally determine that a user viewing the screen is an authorized or recognized user and, if yes, in response to a positive determination, decrypting the encrypted content into a format suitable for display on said screen of said data processing application;

causing display of the decrypted content on said screen only after the user is authorized or recognized;

storing the decrypted content locally in a memory of the electronic processing device only during display of the decrypted content on the screen; and receiving a continuous stream of the biometric data input and continuously reverifying the biometric data input to continue to display the decrypted content;

wherein the data processing application is configured when executing to disable any function of said electronic processing device which would enable a user of the electronic processing device to make a copy from the memory of the decrypted content stored therein; and the data processing application is configured when closing to delete said decrypted content in the memory of the electronic processing device.

15. A system for displaying content on a screen of an electronic processing device, said system comprising:

a first electronic processing device in communication with a second electronic processing device, said first electronic processing device configured to transmit content to said second electronic processing device;

wherein said second electronic processing device has a data processing application configured to receive said transmitted content and to perform the steps of:

upon a user opening a message or invitation to view content received by said data processing application, said content being encrypted, causes the data processing application to configure a camera and/or sensor of the electronic processing device to capture biometric data;

monitoring the camera and/or sensor of the electronic processing device to receive a biometric data input;

using the biometric data input to locally determine that a user viewing the screen is an authorized or recognized user and, if yes, in response to a positive determination, decrypting the encrypted content into a format suitable for display on said screen of said data processing application;

causing display of the decrypted content on said screen only after the user is authorized or recognized;

storing the decrypted content locally in a memory of the electronic processing device only during display of the decrypted content on the screen; and receiving a continuous stream of the biometric data input and continuously reverifying the biometric data input to continue to display the decrypted content;

wherein the data processing application is configured when executing to disable any function of said electronic processing device which would enable a user of the electronic processing device to make a copy from the memory of the decrypted content stored therein; and the data processing application is configured when closing to delete said decrypted content in the memory of the electronic processing device.

16. A computer implemented method of displaying content on a screen of an electronic processing device, wherein a data processing application of said electronic processing device is configured to perform the steps of:

upon a user opening a message or invitation to view content received by said data processing application, said content being encrypted, causes the data processing application to configure a camera and/or sensor of the electronic processing device to capture biometric data;

monitoring the camera and/or sensor of the electronic processing device to receive a biometric data input;

using the biometric data input to locally determine that a user viewing the screen is an authorized or recognized user and, if yes, in response to a positive determination, decrypting the encrypted content into a format suitable for display on said screen of said data processing application;

causing display of the decrypted content on said screen only after the user is authorized or recognized;

storing the decrypted content locally in a memory of the electronic processing device only during display of the decrypted content on the screen; and receiving a continuous stream of the biometric data input and continuously reverifying the biometric data input to continue to display the decrypted content;

wherein the data processing application is configured when closing to delete said decrypted content in the memory of the electronic processing device.

* * * * *